US012666168B2

(12) United States Patent
Muramatsu

(10) Patent No.: US 12,666,168 B2
(45) Date of Patent: Jun. 23, 2026

(54) SOLID-STATE IMAGING DEVICE AND METHOD OF OUTPUTTING IMAGING DATA

(71) Applicant: Sony Semiconductor Solutions Corporation, Kanagawa (JP)

(72) Inventor: Yoshinori Muramatsu, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 36 days.

(21) Appl. No.: 18/832,335

(22) PCT Filed: Jan. 16, 2023

(86) PCT No.: PCT/JP2023/001035
§ 371 (c)(1),
(2) Date: Jul. 23, 2024

(87) PCT Pub. No.: WO2023/176125
PCT Pub. Date: Sep. 21, 2023

(65) Prior Publication Data
US 2025/0184626 A1      Jun. 5, 2025

(30) Foreign Application Priority Data

Mar. 14, 2022    (JP) ................................. 2022-038863

(51) Int. Cl.
*H04N 25/42*          (2023.01)
*H04N 25/76*          (2023.01)
(52) U.S. Cl.
CPC ......... *H04N 25/42* (2023.01); *H04N 25/7795* (2023.01)

(58) Field of Classification Search
CPC ........................... H04N 25/42; H04N 25/7795
(Continued)

(56) References Cited

U.S. PATENT DOCUMENTS

2019/0005884 A1*    1/2019   Yoo ...................... G09G 3/3266

FOREIGN PATENT DOCUMENTS

JP          2004180240 A        6/2004
JP          2019029952 A        2/2019
WO          2022014271 A1       1/2022

OTHER PUBLICATIONS

International Search Report (PCT/ISA/210), International Application No. PCT/JP2023/001035, dated , Mar. 28, 2023.

* cited by examiner

*Primary Examiner* — Joel W Fosselman
(74) *Attorney, Agent, or Firm* — Michael Best & Friedrich LLP

(57)          ABSTRACT
Simplified solid-state imaging device configurations for outputting imaging data and low-resolution data are disclosed. In one example, a solid-state imaging device includes an imaging unit, a resolution conversion unit, and a switching unit. The imaging unit generates the imaging data. The resolution conversion unit reduces a resolution of the imaging data to convert the imaging data into the low-resolution data. The switching unit switches between output of the imaging data and output of the low-resolution data on the basis of setting of a designated region on an imaging region of the imaging unit. A region control unit controls the designated region on the imaging region of the imaging unit and controls switching of the switching unit on the basis of a position of the designated region may be further included.

11 Claims, 14 Drawing Sheets

(58) Field of Classification Search
USPC ..................................................... 348/222.1
See application file for complete search history.

SOLID-STATE IMAGING DEVICE AND METHOD OF OUTPUTTING IMAGING DATA

TECHNICAL FIELD

The present technology relates to a solid-state imaging device and a method of outputting imaging data. Specifically, the present technology relates to a solid-state imaging device that outputs pieces of imaging data having different resolutions from each other and a method of outputting the imaging data.

BACKGROUND ART

There is a method of acquiring a low-resolution entire video and a high-resolution partial video by using a high-resolution solid-state imaging element in order to cope with restriction of a transmission band of image data while coping with high resolution of an image. In this method, a scanning unit and an accumulation unit for low-resolution video are provided separately from a scanning unit and an accumulation unit for high-resolution video. Then, at the time of acquiring the high-resolution video, the scanning unit and the accumulation unit are switched to the scanning unit and the accumulation unit for high-resolution video, and at the time of acquiring the low-resolution video, the scanning unit and the accumulation unit are switched to the scanning unit and the accumulation unit for low-resolution video (see, for example, Patent Document 1).

CITATION LIST

Patent Document

Patent Document 1: Japanese Patent Application Laid-Open No. 2004-180240

SUMMARY OF THE INVENTION

Problems to be Solved by the Invention

However, in the above-described conventional technology, the scanning units of different systems are required for high-resolution video and low-resolution video, and a frame memory for storing video data output from a pixel array unit is required.

The present technology has been made in view of such a situation, and an object thereof is to simplify a configuration for outputting imaging data and low-resolution data.

Solutions to Problems

The present technology has been made to solve the above-described problems, and the first aspect thereof is a solid-state imaging device including: an imaging unit configured to generate imaging data; a resolution conversion unit configured to reduce a resolution of the imaging data to convert the imaging data into low-resolution data; and a switching unit configured to switch between output of the imaging data and output of the low-resolution data on the basis of setting of a designated region on an imaging region of the imaging unit. This brings about an effect that the imaging data and the low-resolution data are output from the solid-state imaging device without separately providing a scanning system at the time of reading the imaging data and a scanning system at the time of reading the low-resolution data.

Furthermore, in the first aspect, a region control unit that controls the designated region on the imaging region of the imaging unit and controls switching of the switching unit on the basis of a position of the designated region may be further included. This brings about an effect that the imaging data and the low-resolution data are output from the solid-state imaging device while controlling a cut-out position of the imaging data.

Furthermore, in the first aspect, the switching unit may output the imaging data for a row including the designated region, and outputs the low-resolution data for a row not including the designated region. This brings about an effect that the imaging data and the low-resolution data are output separately for each row.

Furthermore, in the first aspect, a first memory that stores the low-resolution data generated by the resolution conversion unit for one row and outputs the low-resolution data to the switching unit may be further included. This brings about an effect that the output timing of the low-resolution data is adjusted for each row.

Furthermore, in the first aspect, the region control unit may include a timing controller that controls output timing of the first memory and switching timing of the switching unit on the basis of the setting of the designated region. This brings about an effect that the output timing of the low-resolution data is adjusted.

Furthermore, in the first aspect, the timing controller may control the output timing of the first memory and the switching timing of the switching unit such that the low-resolution data is output to a position other than the designated region and the imaging data is output to a position of the designated region. This brings about an effect that the imaging data of the designated region and the low-resolution data of the entire imaging region including the designated region are separately output.

Furthermore, in the first aspect, a second memory that stores the imaging data generated by the imaging unit for one row and outputs the imaging data to the switching unit may be further included. This brings about an effect that the output timing of the imaging data is adjusted for each row.

Furthermore, in the first aspect, the switching unit may output the low-resolution data stored in the first memory and the imaging data stored in the second memory for each row so as not to overlap. This brings about an effect that the imaging data of the designated region and the low-resolution data of the entire imaging region including the designated region are separately output while outputting the imaging data of the designated region to a position other than the designated region.

Furthermore, in the first aspect, the region control unit may include a timing controller that controls output timing of the first memory, output timing of the second memory, and switching timing of the switching unit on the basis of the setting of the designated region. This brings about an effect that the output timing of the imaging data and the output timing of the low-resolution data of the designated region are adjusted.

Furthermore, in the first aspect, the timing controller may control the output timing of the first memory, the output timing of the second memory, and the switching timing of the switching unit such that the imaging data is output for a range of the designated region and the low-resolution data is output to a position other than an output position of the imaging data. This brings about an effect that the imaging data of the designated region and the low-resolution data are output.

Furthermore, in the first aspect, the timing controller may control the output timing of the first memory, the output timing of the second memory, and the switching timing of the switching unit such that the low-resolution data is output for a range of the designated region and the imaging data is output to a position other than an output position of the low-resolution data. This brings about an effect that the low-resolution data of the designated region and the imaging data are output.

Furthermore, the second aspect is a method of outputting imaging data, the method including: a procedure of generating imaging data; a procedure of reducing a resolution of the imaging data to convert the imaging data into low-resolution data; and a procedure of switching between output of the imaging data and output of the low-resolution data on the basis of setting of a designated region on an imaging region in which the imaging data is captured. This brings about an effect that the imaging data and the low-resolution data are output without separately providing a scanning system at the time of reading the imaging data and a scanning system at the time of reading the low-resolution data.

BRIEF DESCRIPTION OF DRAWINGS

FIG. 1 is a block diagram illustrating a configuration example of a solid-state imaging device according to a first embodiment.

FIG. 2 is a block diagram illustrating a configuration example of a camera system to which the solid-state imaging device according to the first embodiment is applied.

FIG. 6 is a block diagram illustrating a configuration example of a solid-state imaging device according to a second embodiment.

FIG. 9 is a block diagram illustrating a configuration example of a solid-state imaging device according to a third embodiment.

MODE FOR CARRYING OUT THE INVENTION

Figure 3:
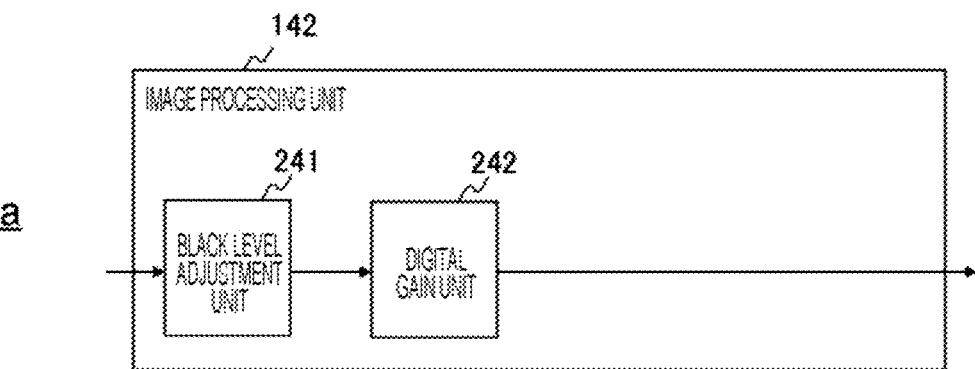
FIG. 3 is block diagrams illustrating configuration examples of an image processing unit used in the solid-state imaging device according to the first embodiment.
Figure 3:
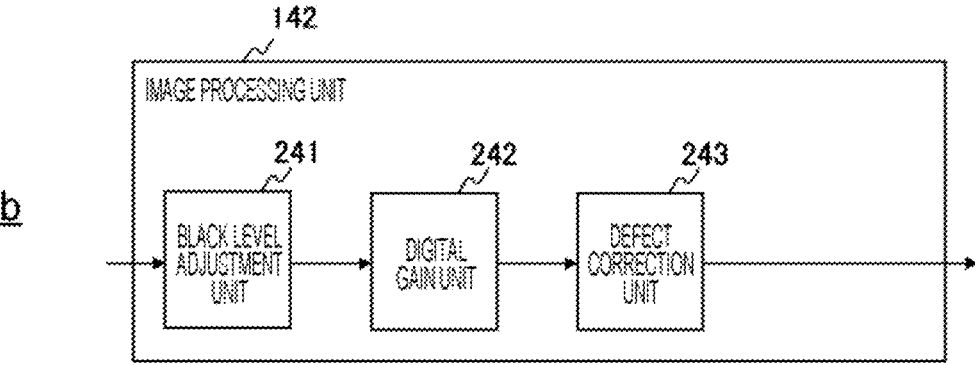
Figure 3:
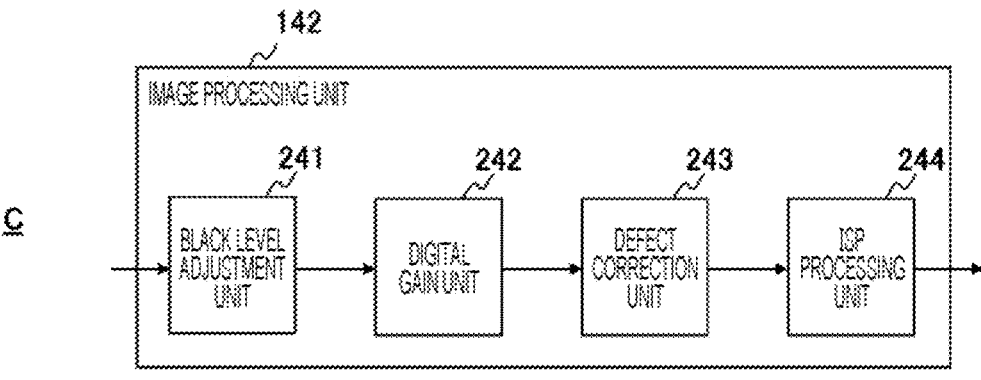

Hereinafter, modes for carrying out the present technology (hereinafter referred to as embodiments) will be described. The description will be given in the following order.

1. First Embodiment (an example of outputting imaging data for a row including a region of interest (ROI) region and outputting low-resolution data for a row not including a ROI region)

2. Second Embodiment (an example of outputting low-resolution data to a position other than a ROI region and outputting imaging data to a position of a ROI region)

3. Third Embodiment (an example of outputting imaging data for a range of a ROI region and outputting low-resolution data to a position other than an output position of the imaging data)

4. Fourth Embodiment (an example of outputting low-resolution data for a range of a ROI region and outputting imaging data to a position other than an output position of the imaging data)

5. Fifth Embodiment (an example of stacking solid-state imaging devices).

1. First Embodiment

Figure 1:
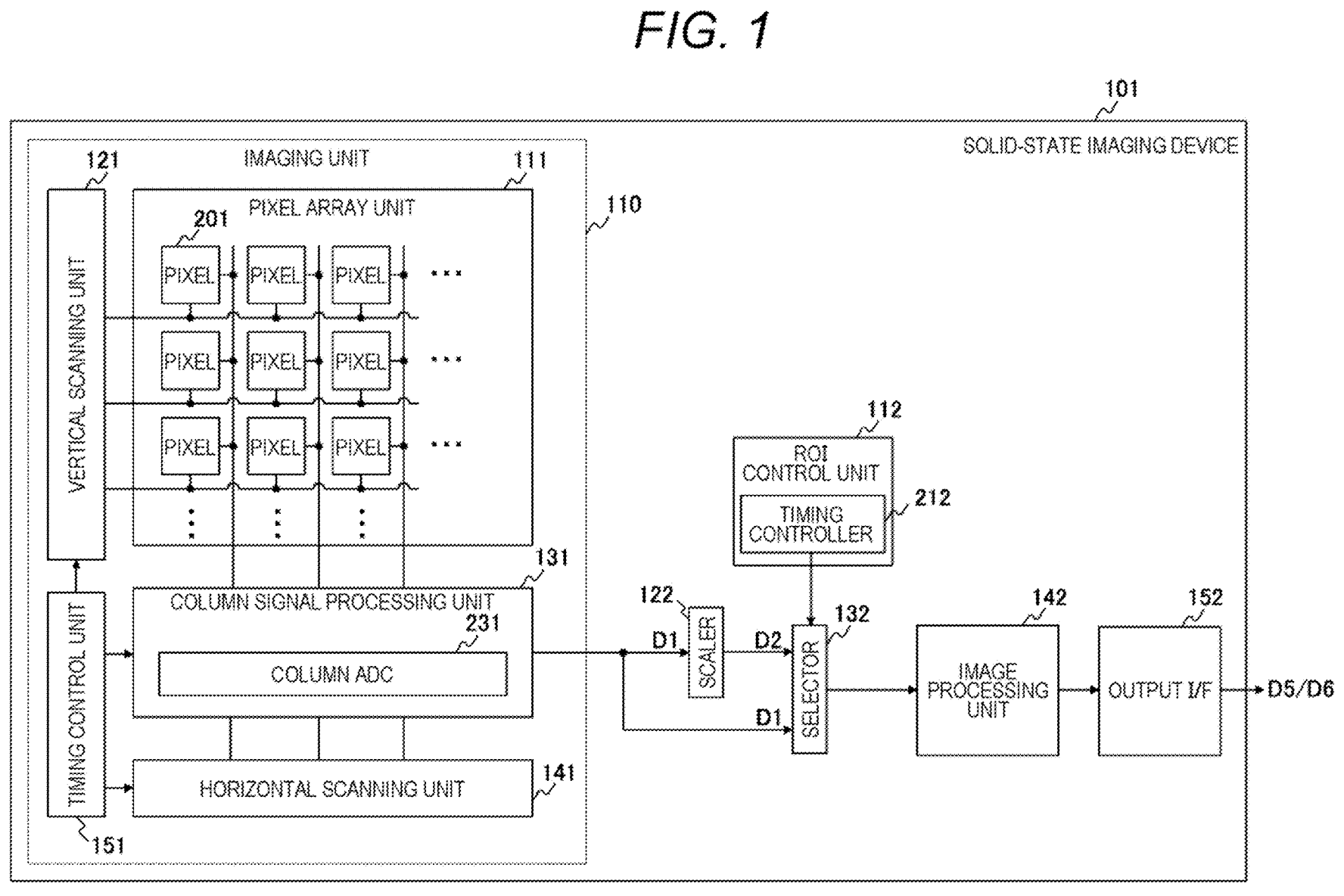

FIG. 1 is a block diagram illustrating a configuration example of a solid-state imaging device according to a first embodiment.

In the drawing, a solid-state imaging device 101 includes an imaging unit 110, a ROI control unit 112, a scaler 122, a selector 132, an image processing unit 142, and an output interface 152. Note that the imaging unit 110, the ROI control unit 112, the scaler 122, the selector 132, the image processing unit 142, and the output interface 152 may be formed on one semiconductor chip or may be formed separately on a plurality of semiconductor chips.

The imaging unit 110 generates imaging data D1. The imaging unit 110 includes a pixel array unit 111, a vertical scanning unit 121, a column signal processing unit 131, a horizontal scanning unit 141, and a timing control unit 151.

The pixel array unit 111 includes a plurality of pixels 201. The pixels 201 are arranged in a matrix along a row direction (also referred to as a row direction or a horizontal direction) and a column direction (also referred to as a column direction or a vertical direction). The pixel 201 photoelectrically converts light from an object to generate a pixel signal.

The vertical scanning unit 121 scans the pixels 201 to be read in the column direction. The vertical scanning unit 121 may be configured using a vertical register.

The column signal processing unit 131 processes a signal transmitted from each pixel 201 in the column direction. For example, the column signal processing unit 131 can perform correlated double sampling (CDS) processing on the basis of the signal transmitted in the column direction from each pixel 201. The column signal processing unit 131 includes a column ADC 231. The column analog to digital converter (ADC) 231 can perform analog to digital (AD) conversion processing for each column on the basis of the signal transmitted in the column direction from each pixel 201.

The horizontal scanning unit 141 scans the pixels 201 to be read in the row direction. The horizontal scanning unit 141 may be configured using a horizontal register.

The timing control unit 151 controls the vertical scanning unit 121, the column signal processing unit 131, and the horizontal scanning unit 141. For example, the timing control unit 151 can control scanning timing in the column direction, scanning timing in the row direction, and processing timing of the column signal processing unit 131.

The scaler 122 performs resolution conversion for the imaging data D1 generated by the imaging unit D1. In this resolution conversion, the scaler 122 can reduce the resolution of the imaging data D1 to convert the imaging data D1 into low-resolution data D2. In reducing the resolution of the imaging data D1, the scaler 122 can perform digital addition processing. For example, the resolution reduction of a 4 k image (H:V=3840:2160) may be ¼ (H:V=1920:1080), ⅛ (H:V=1280:720), or 1/16 (H:V=960:540). Note that the scaler 122 is an example of a resolution conversion unit described in the claims.

The selector 132 switches between output of the imaging data D1 and output of the low-resolution data D2. For example, the selector 132 outputs the imaging data D1 for a row including a ROI region, and outputs the low-resolution data D2 for a row not including a ROI region. The ROI region is set on an imaging region of the imaging unit 110. Note that the ROI region is an example of a designated region described in the claims. Note that the selector 132 is an example of a switching unit described in the claims.

The ROI control unit 112 controls the ROI region on the imaging region of the imaging unit 110, and controls switching of the selector 132 on the basis of a position of the ROI region. The control of the ROI region may be performed by the ROI control unit 112 itself or may be performed on the basis of an instruction from an outside. The control of the ROI region may be performed on the basis of, for example, at least one of feature detection, histogram detection, motion tracking, feature tracking, histogram tracking, or person tracking.

The ROI control unit 112 includes a timing controller 212. The timing controller 212 controls switching timing of the selector 132. For example, the timing controller 212 can control the switching timing of the selector 132 such that the imaging data D1 is output for the row including the ROI region and the low-resolution data D2 is output for the row not including the ROI region.

Note that the ROI region may be set in the entire imaging region. At this time, the timing controller 212 can cause the image processing unit 142 to output the imaging data D1 of all the pixels as it is via the selector 132. Therefore, in a case where the ROI region is set in the entire imaging region, the ROI control unit 112 can cause the output interface 152 to output the imaging data D1 of all the pixels generated by the imaging unit 110, and can cause the solid-state imaging device 101 to operate as a normal imaging device.

Furthermore, the ROI region may not be set in the imaging region. At this time, the timing controller 212 can cause the image processing unit 142 to output the low-resolution data D2 via the selector 132 for the entire imaging region. Therefore, in the case where the ROI region is not set in the imaging region, the ROI control unit 112 can cause the imaging data D1 generated by the imaging unit 110 to be output from the output interface 152 after reducing the resolution of all the pixels. Note that the ROI control unit 112 is an example of a region control unit described in the claims.

The image processing unit 142 performs image processing for the imaging data D1 and the low-resolution data D2 output via the selector 132. For example, the image processing unit 142 may perform black level adjustment, digital gain processing, defect correction processing, or correction processing for distortion generated in an optical system.

The output interface 152 outputs the data that has been image-processed by the image processing unit 142 to the outside of the solid-state imaging device 101. At this time, the output interface 152 can perform data conversion for the output of the image processing unit 142 such that output formats of imaging data D5 and low-resolution data D6 output from the solid-state imaging device 101 conform to a transmission destination standard. This standard may be, for example, a mobile industry processor interface (MIPI).

Figure 2:
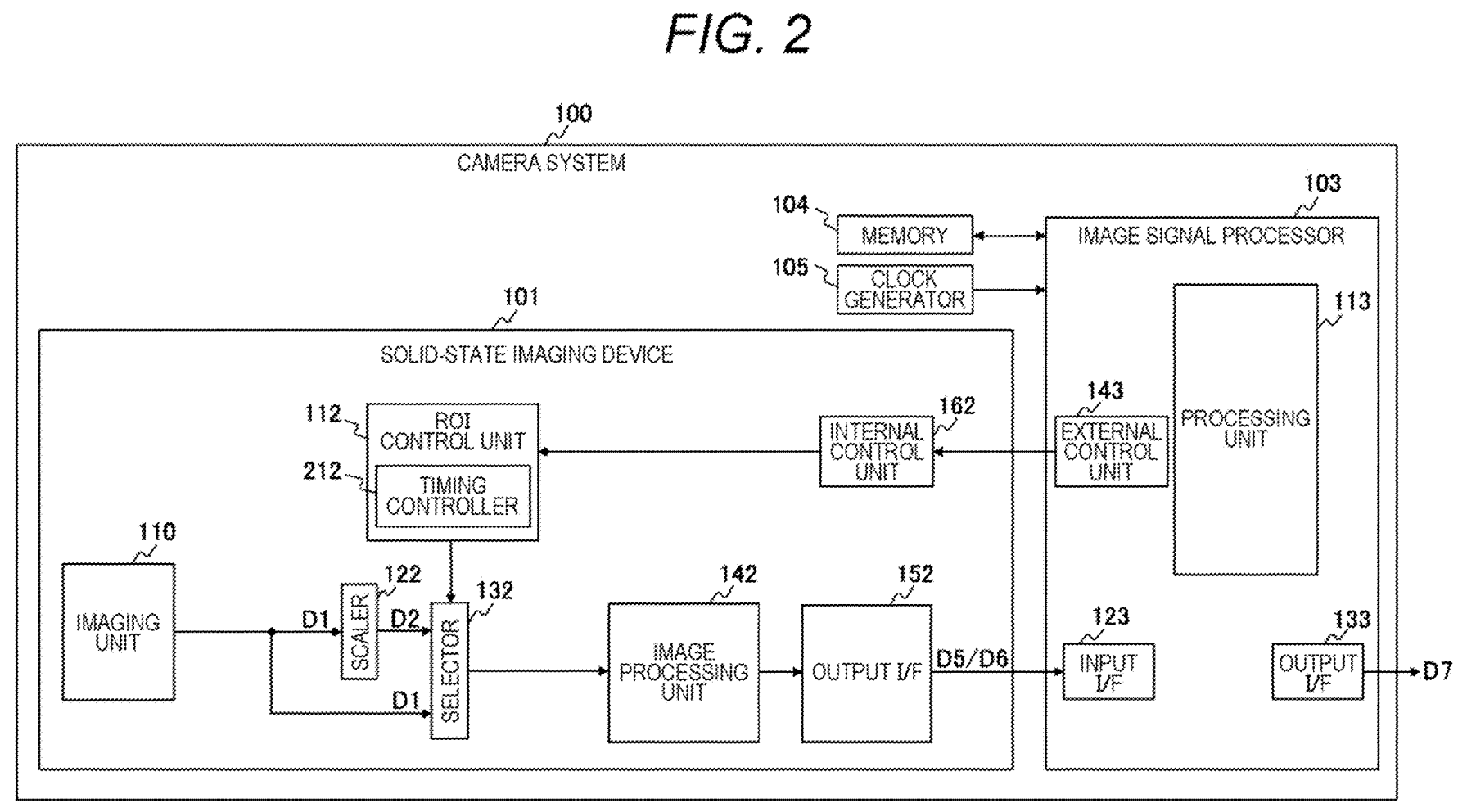

FIG. 2 is a block diagram illustrating a configuration example of a camera system to which the solid-state imaging device according to the first embodiment is applied.

In the drawing, a camera system 100 includes the solid-state imaging device 101, an image signal processor 103, a memory 104, and a clock generator 105.

The image signal processor 103 generates a composite image D7 on the basis of the imaging data D5 and the low-resolution data D6 output from the solid-state imaging device 101. Furthermore, the image signal processor 103 can instruct the solid-state imaging device 101 on the ROI region or instruct an operation mode of the solid-state imaging device 101. As the operation mode of the solid-state imaging device 101, for example, a composition mode, a high resolution mode, and a low resolution mode may be provided. The composition mode is, for example, a mode to cause the solid-state imaging device 101 to output the imaging data D5 for a row including the ROI region, and the solid-state imaging device 101 to output the low-resolution data Do for a row not including the ROI region. The high resolution mode is a mode to cause the solid-state imaging device 101 to output the imaging data D5 for all the pixels of the solid-state imaging device 101. The low resolution mode is a mode to cause the solid-state imaging device 101 to output the low-resolution data D6 for the entire imaging region of the solid-state imaging device 101.

The image signal processor 103 includes a processing unit 113, an input interface 123, an output interface 133, and an external control unit 143.

The processing unit 113 performs image processing, composite processing, ROI processing, and the like. In the image processing, the processing unit 113 performs image signal processing (ISP) and the like. In the composite processing, the processing unit 113 generates the composite image D7 on the basis of the imaging data D5 and the low-resolution data D6. At this time, the processing unit 113 can appropriately set an insertion position and a magnification of the imaging data D5 of a portion corresponding to the ROI region in the composite image D7. In the ROI processing, the processing unit 113 determines the ROI region on the basis of, for example, at least one of feature detection, histogram detection, motion tracking, feature tracking, histogram tracking, or person tracking.

The input interface 123 receives the imaging data D5 and the low-resolution data D6 output from the solid-state imaging device 101. The output interface 133 transmits the composite image D7 generated by the processing unit 113. The output interface 133 may conform to a protocol of a network used in a web conference camera or the like.

The external control unit 143 instructs the solid-state imaging device 101 on the ROI region or instructs the operation mode of the solid-state imaging device 101. The external control unit 143 may instruct the ROI region on the basis of address designation or the like.

The memory 104 stores the imaging data D5 and the low-resolution data D6 output from the solid-state imaging device 101, and stores the composite image D7 generated by the processing unit 113. The clock generator 105 generates a clock for operating the image signal processor 103.

The solid-state imaging device 101 may include an internal control unit 162 that receives a command from the external control unit 143. The internal control unit 162 can instruct the ROI control unit 112 on the ROI region on the basis of the command from the external control unit 143. Furthermore, in the composition mode, the internal control unit 162 controls the ROI control unit 112 such that, for example, the imaging data D5 is output for a row including the ROI region, and the low-resolution data D6 is output for a row not including the ROI region. Furthermore, in the high resolution mode, the internal control unit 162 controls the ROI control unit 112 such that the imaging data D1 is output from the selector 132 for all the pixels of the solid-state imaging device 101. Furthermore, in the low resolution mode, the internal control unit 162 controls the ROI control unit 112 such that the low-resolution data D2 is output from the selector 132 for the entire imaging region of the solid-state imaging device 101.

FIG. 3 is block diagrams illustrating configuration examples of the image processing unit used in the solid-state imaging device according to the first embodiment. Note that a in the drawing illustrates a first example of the image processing unit, b in the drawing illustrates a second example of the image processing unit, and c in the drawing illustrates a third example of the image processing unit.

In a of the drawing, the image processing unit 142 includes a black level adjustment unit 241 and a digital gain unit 242. The black level adjustment unit 241 adjusts a black level of the imaging data D1 and the low-resolution data D2. The digital gain unit 242 adjusts digital gains of the imaging data D1 and the low-resolution data D2.

In b of the drawing, the image processing unit 142 includes the black level adjustment unit 241, the digital gain unit 242, and a defect correction unit 243. The defect correction unit 243 corrects defects of the imaging data D1 and the low-resolution data D2.

In c of the drawing, the image processing unit 142 includes the black level adjustment unit 241, the digital gain unit 242, the defect correction unit 243, and an ISP processing unit 244. The ISP processing unit 244 performs pixel interpolation and noise reduction processing for the imaging data D1 and the low-resolution data D2.

Figure 4:
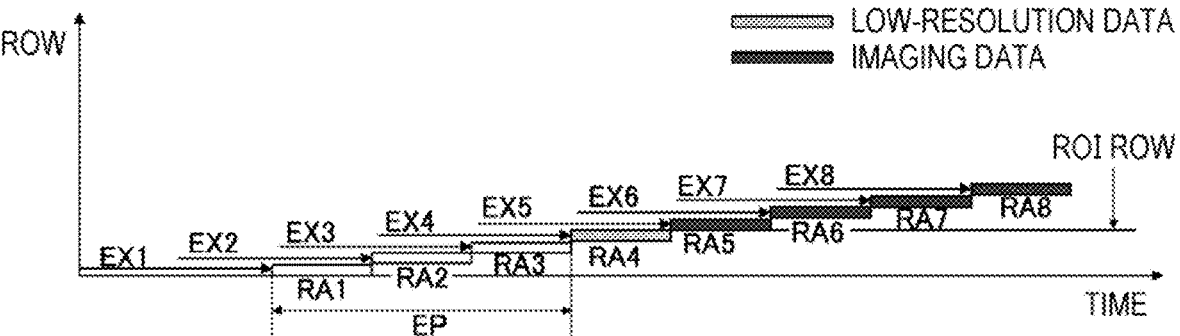
FIG. 4 is a timing chart illustrating read timing of imaging data and low-resolution data according to the first embodiment.

FIG. 4 is a timing chart illustrating read timing of the imaging data and the low-resolution data according to the first embodiment. Note that the drawing illustrates an example in which the vertical and horizontal dimensions of the imaging data D1 are reduced to ¼ as the low-resolution data D2. Furthermore, the drawing illustrates exposures EX1 to EX8 and reads and outputs RA1 to RA8 for eight rows before and after a ROI row.

In the drawing, in the imaging unit 110, the exposures EX1 to EX8 are sequentially started row by row, and the reads and outputs RA1 to PAS of pixel signals are sequentially performed row by row. Here, in one row before the ROI row, the read and output RA4 of the low-resolution data D6 of the row not including the ROI region is performed. Then, in the ROI row, the output from the selector 132 is switched from the low-resolution data D2 to the imaging data D1. Then, in four rows after the ROI row, the reads and outputs RA8 to RAB of the imaging data D5 of each row including the ROI region is performed. At this time, the imaging unit 110 may reduce power consumption by performing inter-row thinning EP in the reads and outputs RA1 to RA3 before the ROI row.

Figure 5:
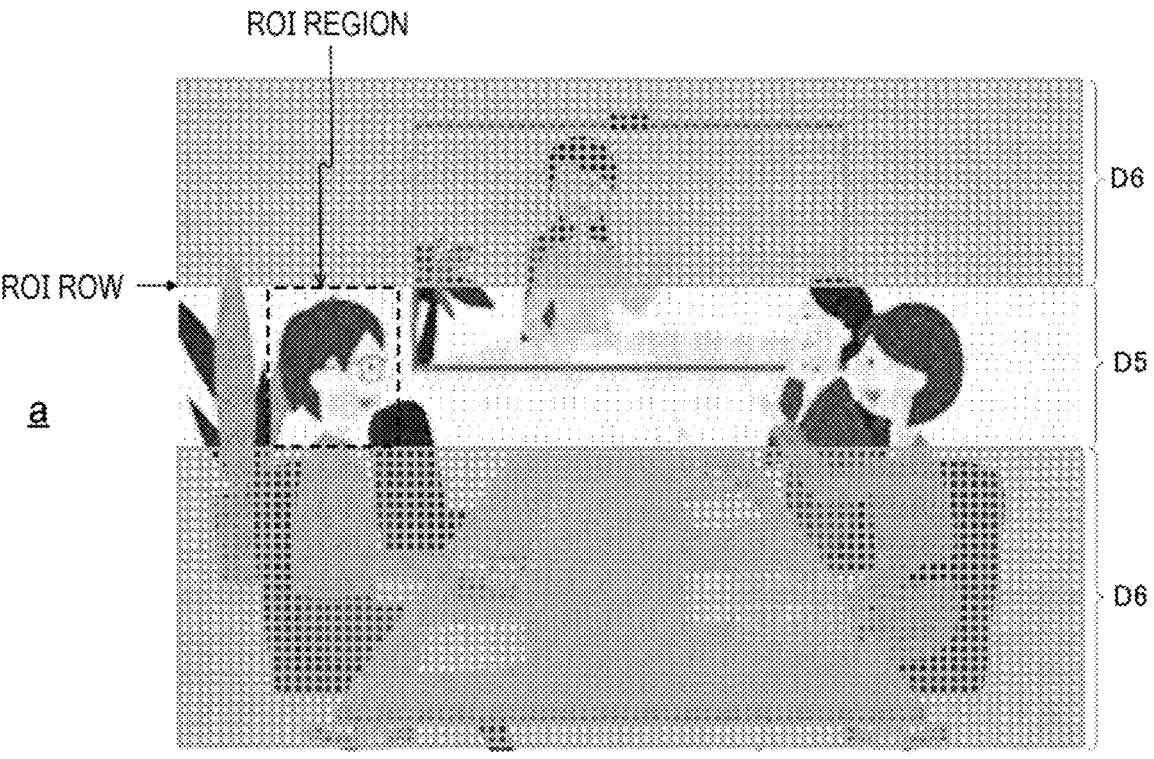
FIG. 5 is diagrams illustrating examples of the imaging data and the low-resolution data according to the first embodiment.
Figure 5:
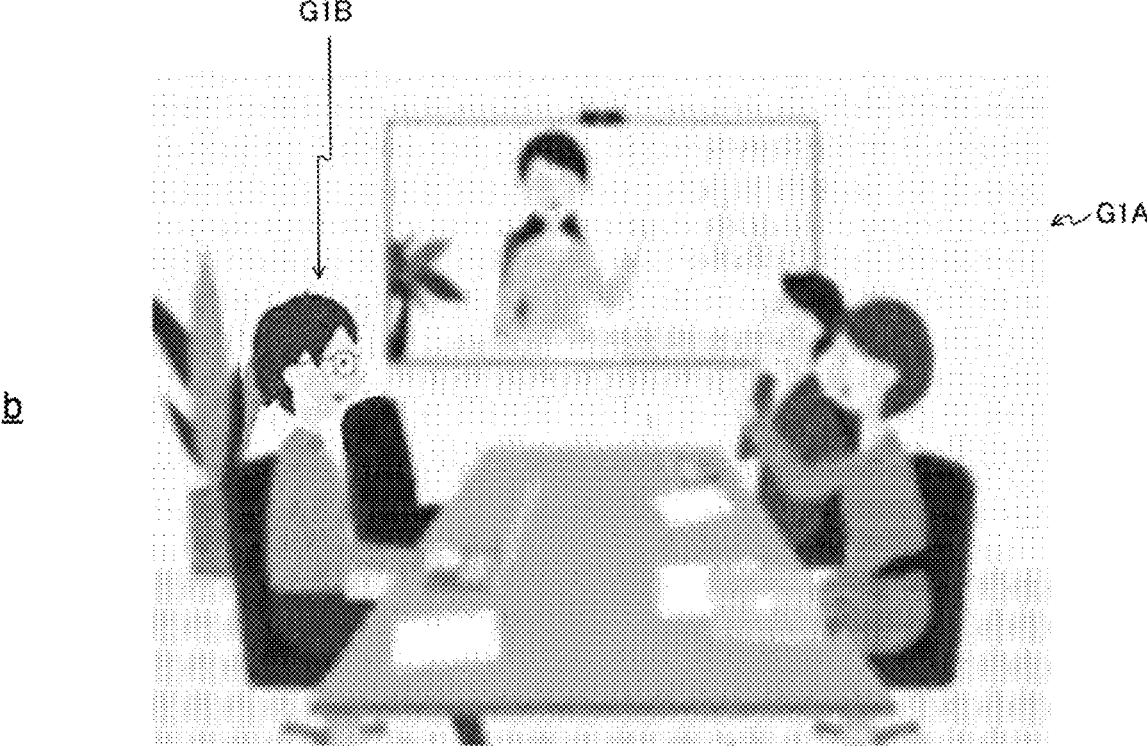

FIG. 5 is diagrams illustrating examples of the imaging data and the low-resolution data according to the first embodiment. Note that a in the drawing is a diagram illustrating an example of the imaging data D5 and the low-resolution data D6 for one frame output from the solid-state imaging device 101. b in the drawing is a diagram illustrating an example of the composite image D7 combined on the basis of the imaging data D5 and the low-resolution data D6 of a in the drawing. Note that the ROI row in a of the drawing corresponds to the ROI row in FIG. 4.

In a of the drawing, the solid-state imaging device 101 outputs the imaging data D5 in a row including the ROI region, and outputs the low-resolution data D6 in a row not including the ROI region. The imaging data D5 and the low-resolution data D6 are input to the above-described image signal processor 103.

The image signal processor 103 generates the composite image D7 on the basis of the imaging data D5 and the low-resolution data D6. At this time, as illustrated in b of the drawing, the image signal processor 103 can cut out the portion corresponding to the ROI region from the imaging data D5 in a of the drawing as a high-resolution image GIB and generate low-resolution image data from the imaging data D5. Furthermore, the image signal processor 103 can generate low-resolution image GIA of b in the drawing on the basis of the low-resolution data generated from the imaging data D5 of a in the drawing and the low-resolution data D6 received from the solid-state imaging device 101. Then, the image signal processor 103 can generate the composite image D7 by inserting the high-resolution image GIB into the low-resolution image GIA such that the high-resolution image GIB is positioned in the ROI region of a in the drawing.

As described above, in the above-described first embodiment, the solid-state imaging device 101 outputs the imaging data D5 in the row including the ROI region, and outputs the low-resolution data D6 in the row not including the ROI region. Therefore, it is not necessary to provide a scanning system at the time of reading the low-resolution data D2 separately from a scanning system at the time of reading the imaging data D1, and it is possible to suppress an increase in circuit scale. Furthermore, it is possible to reduce a data band in regions other than the ROI region while enabling generation of a high-definition image, and it is possible to reduce a load on a network while suppressing a decrease in visibility of an image displayed in a web conference or the like.

Furthermore, it is not necessary to provide a frame memory in the solid-state imaging device 101 in order to generate the low-resolution data D2, and it is possible to suppress an increase in memory capacity of the solid-state imaging device 101.

Furthermore, it is possible to generate the imaging data D5 and the low-resolution data D6 on the basis of the processing and read of the imaging data D1 in units of rows, and it is possible to suppress a decrease in latency of the solid-state imaging device 101.

2. Second Embodiment

In the above-described first embodiment, the solid-state imaging device 101 has outputted the imaging data D5 in the row including the ROI region, and has outputted the low-resolution data D6 in the row not including the ROI region. In a second embodiment, a row delay memory that delays timing of outputting low-resolution data D2 to a selector 132 is provided in a solid-state imaging device.

Figure 6:
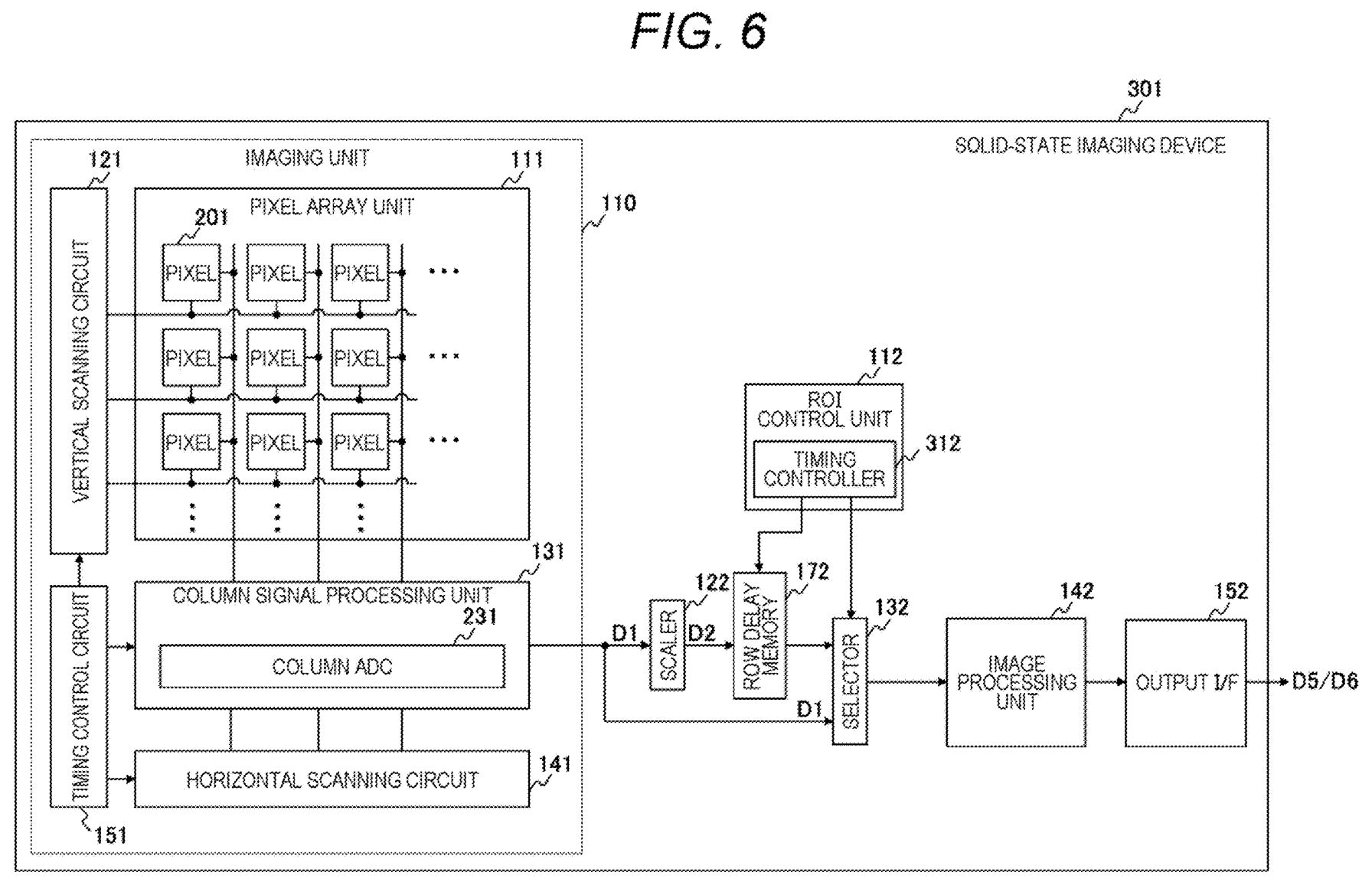

FIG. 6 is a block diagram illustrating a configuration example of a solid-state imaging device according to the second embodiment.

In the drawing, in a solid-state imaging device 301, a row delay memory 172 is added to the solid-state imaging device 101 of the first embodiment described above. Furthermore, a ROI control unit 112 includes a timing controller 312 instead of the timing controller 212 of the first embodiment described above. Other configurations of the solid-state imaging device 301 of the second embodiment are similar to those of the solid-state imaging device 101 of the first embodiment described above.

The row delay memory 172 stores the low-resolution data D2 for one row. At this time, the row delay memory 172 can delay timing of outputting the low-resolution data D2 to the selector 132. Note that the row delay memory 172 is an example of a first memory described in the claims.

The timing controller 312 controls output timing of the row delay memory 172 and switching timing of the selector 132 such that the low-resolution data D2 is output to a position other than a ROI region and imaging data D1 is output to a position of the ROI region. For example, the timing controller 312 can switch an output from the selector 132 to an output of the imaging data D1 at timing when the imaging data D1 of the ROI region is output from an imaging unit 110 in each frame.

Furthermore, the timing controller 312 can control the output timing of the row delay memory 172 and the switching timing of the selector 132 such that low-resolution data D6 is output after the imaging data D1 of the ROI region is output in each frame. At this time, the timing controller 312 may control the output timing of the row delay memory 172 and the switching timing of the selector 132 such that the low-resolution data D6 is output while filling an empty portion in a row direction of the low-resolution data D6.

Figure 7:
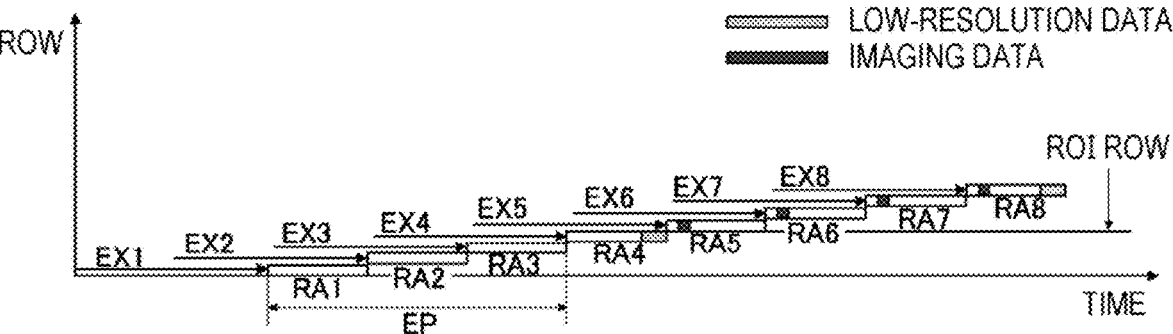
FIG. 7 is a timing chart illustrating read timing of imaging data and low-resolution data according to the second embodiment.

FIG. 7 is a timing chart illustrating read timing of imaging data and low-resolution data according to the second embodiment. Note that the drawing illustrates an example in which the vertical and horizontal dimensions of the imaging data D1 are reduced to ¼ as the low-resolution data D2. Furthermore, the drawing illustrates exposures EX1 to EX8 and reads and outputs RA1 to RA8 for eight rows before and after a ROI row.

In the drawing, in the imaging unit 110, exposures EX1 to EX8 are sequentially started row by row, and reads and outputs RA1 to RA& of pixel signals are sequentially performed row by row. Here, in one row before the ROI row, the read and output RA4 of the low-resolution data D6 of the row is performed. In three rows after the ROI row, the reads and outputs RA5 to RA7 of imaging data D5 of the ROI region are performed. In one row after the ROI row, the read and output PAS of the low-resolution data D6 of the row and the imaging data D5 of the ROI region are performed.

In the reads and outputs RA1 to RA3 and RA8 to RA7, the low-resolution data D6 is empty. In the reads and outputs RA4 and RA8, read timing of the low-resolution data D6 from the row delay memory 172 is set such that the empty portion of the low-resolution data D6 in the row direction is located at a rear end of each row in a filled state.

Figure 8:
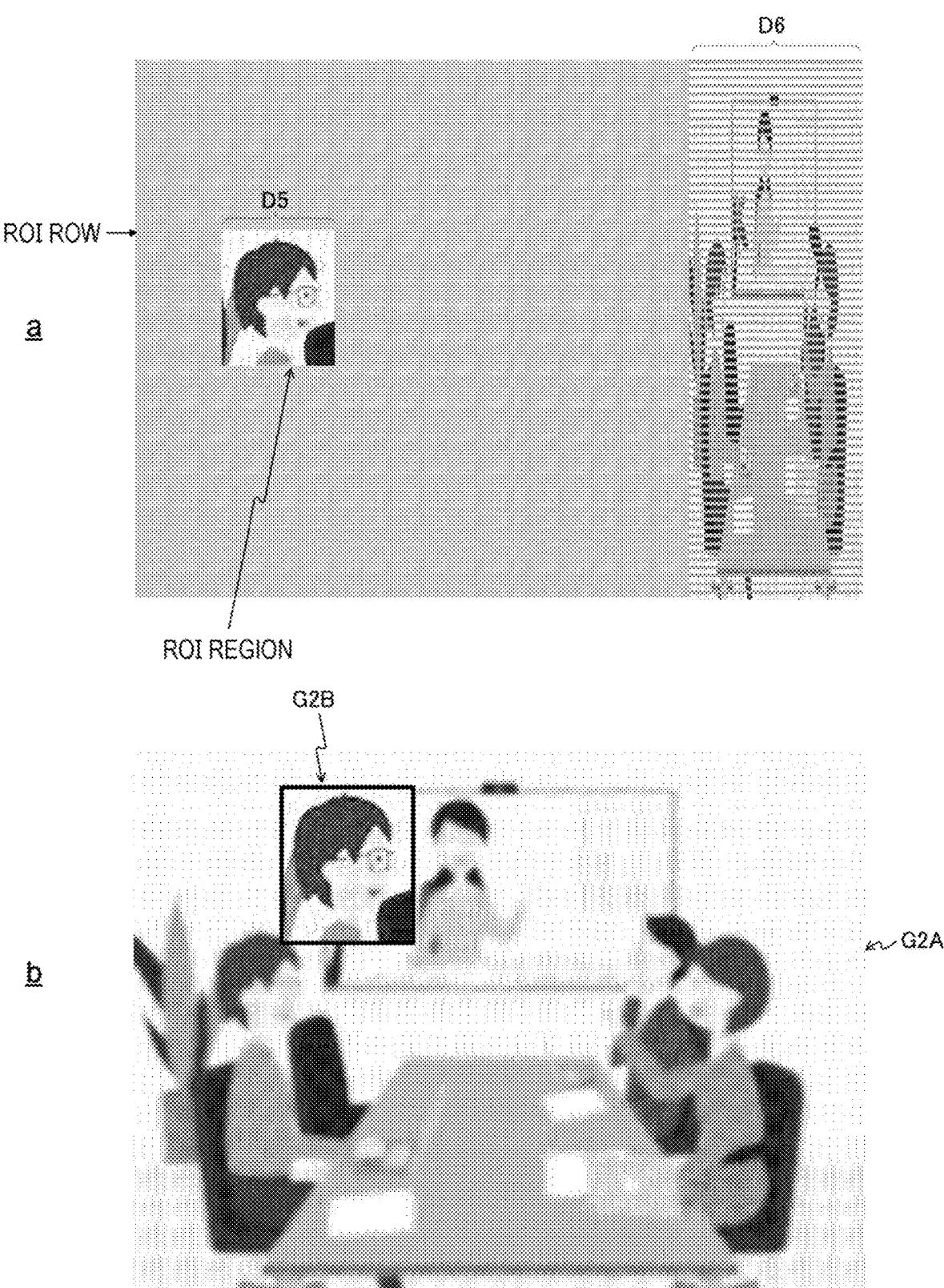
FIG. 8 is diagrams illustrating examples of the imaging data and the low-resolution data according to the second embodiment.

FIG. 8 is diagrams illustrating examples of the imaging data and the low-resolution data according to the second embodiment. Note that a in the drawing is a diagram illustrating an example of the imaging data D5 and the low-resolution data D6 for one frame output from the solid-state imaging device 301. b in the drawing is a diagram illustrating an example of the composite image D7 combined on the basis of the imaging data D5 and the low-resolution data D6 of a in the drawing. Note that the ROI row in a of the drawing corresponds to the ROI row in FIG. 7.

In a of the drawing, the solid-state imaging device 301 outputs the low-resolution data D6 to a position other than the ROI region and outputs the imaging data D5 to a position of the ROI region for each frame. At this time, the solid-state imaging device 301 can output the low-resolution data D6 for each row at the position of the rear end of each row while filling the empty portion in the row direction of the low-resolution data D6. The imaging data D5 and the low-resolution data D6 are input to the above-described image signal processor 103.

The image signal processor 103 generates the composite image D7 on the basis of the imaging data D5 and the low-resolution data D6. At this time, as illustrated in b of the drawing, the image signal processor 103 generates a high-resolution image G2B from the imaging data D5 of the ROI region, and generates a low-resolution image G2A from the low-resolution data D6. Then, the image signal processor 103 can generate the composite image D7 by inserting the high-resolution image G2B into the low-resolution image G2A.

Note that, in the above-described first embodiment, in the row including the ROI region, the imaging data D5 is transmitted and the low-resolution data D6 is not transmitted from the solid-state imaging device 101 even in a region other than the ROI region. Therefore, the image signal processor 103 needs to generate the low-resolution data of other than the ROI region from the imaging data D5 in the row including the ROI. In the second embodiment, even in the row including the ROI region, the low-resolution data D6 is transmitted from the solid-state imaging device 101 in the region other than the ROI region. Therefore, in the second embodiment, the image signal processor 103 does not need to generate low-resolution data of other than the ROI region from the imaging data D5 even in the row including the ROI region, and a load on the image signal processor 103 can be reduced. At this time, the image signal processor 103 may appropriately change a magnification and an arrangement position of the high-resolution image G2B. Furthermore, the image signal processor 103 may provide a frame in the high-resolution image G2B, may pop-up display the high-resolution image G2B on the composite image D7, or may highlight the high-resolution image G2B.

As described above, in the above-described second embodiment, the row delay memory 172 that delays the timing of outputting the low-resolution data D2 to the selector 132 is provided in the solid-state imaging device 301. Therefore, the solid-state imaging device 301 does not need to separate the output of the low-resolution data D6 and the output of the imaging data D5 for each row, and can output the low-resolution data D6 to the position other than the ROI region and output the imaging data D5 to the position of the ROI region. Therefore, the image signal processor 103 can generate the low-resolution image G2A only from the low-resolution data D6, and can reduce the load on the image signal processor 103.

3. Third Embodiment

In the above-described second embodiment, the row delay memory 172 that delays the timing of outputting the low-resolution data D2 to the selector 132 has been provided in the solid-state imaging device 301. In a third embodiment, a row delay memory 172 that delays timing of outputting low-resolution data D2 to a selector 132 and a row delay memory 182 that delays timing of outputting imaging data D1 to the selector 132 are provided in a solid-state imaging device.

Figure 9:
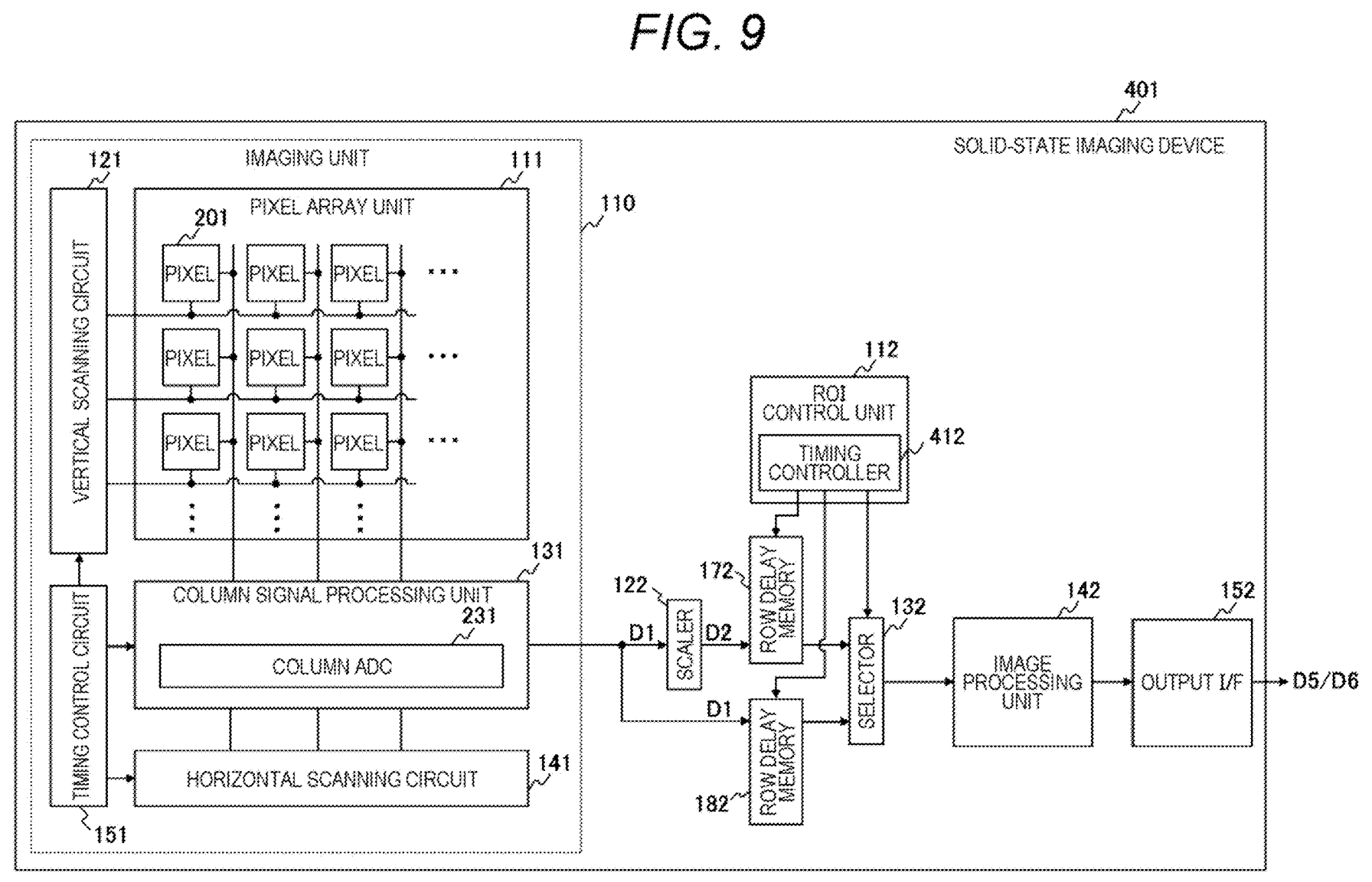

FIG. 9 is a block diagram illustrating a configuration example of a solid-state imaging device according to the third embodiment.

In the drawing, in a solid-state imaging device 401, the row delay memory 182 is added to the solid-state imaging device 301 of the second embodiment described above. Furthermore, a ROI control unit 112 includes a timing controller 412 instead of the timing controller 212 of the first embodiment described above. Other configurations of the solid-state imaging device 401 of the third embodiment are similar to those of the solid-state imaging device 301 of the second embodiment described above.

The row delay memory 182 stores the imaging data D1 for one row. At this time, the row delay memory 182 can delay the timing of outputting the imaging data D1 to the selector 132. Note that the row delay memory 182 is an example of a second memory described in the claims.

The timing controller 412 controls output timing of each of the row delay memories 172 and 182 and switching timing of the selector 132 such that the imaging data D1 is output for a range of a ROI region. Furthermore, the timing controller 412 controls the output timing of each of the row delay memories 172 and 182 and the switching timing of the selector 132 such that the low-resolution data D2 is output to a position other than an output position of the imaging data D1. For example, the timing controller 412 can control the output timing of the row delay memory 182 and the switching timing of the selector 132 such that the imaging data D1 is output according to the range of the ROI region. Furthermore, the timing controller 412 can control the output timing of the row delay memory 172 and the switching timing of the selector 132 such that low-resolution data D6 is output without overlapping with the output timing of the imaging data D1 in the ROI region. At this time, the timing controller 412 may control the output timing of the row delay memory 172 and the switching timing of the selector 132 such that the low-resolution data D6 is output while filling an empty portion in a row direction of the low-resolution data D6.

Figure 10:
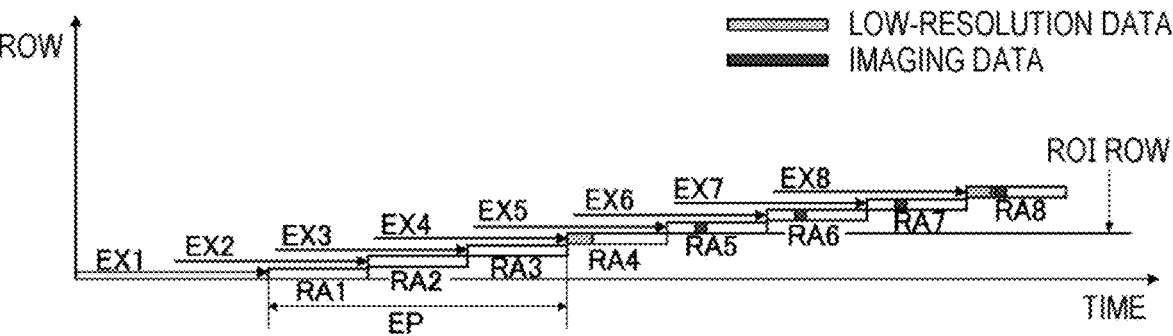
FIG. 10 is a timing chart illustrating read timing of imaging data and low-resolution data according to the third embodiment.

FIG. 10 is a timing chart illustrating read timing of imaging data and low-resolution data according to the third embodiment. Note that the drawing illustrates an example in which the vertical and horizontal dimensions of the imaging data D1 are reduced to ¼ as the low-resolution data D2. Furthermore, the drawing illustrates exposures EX1 to EX8 and reads and outputs RA1 to RA8 for eight rows before and after a ROI row.

In the drawing, in an imaging unit 110, the exposures EX1 to EX8 are sequentially started row by row, and the reads and outputs RA1 to RA8 of pixel signals are sequentially performed row by row. Here, in one row before the ROI row, the read and output RA4 of the low-resolution data D6 of the row is performed. In three rows after the ROI row, the reads and outputs RA5 to RA7 of imaging data D5 of the ROI region are performed. In one row after the ROI row, the read and output RAB of the low-resolution data D6 of the row and the imaging data D5 of the ROI region are performed.

In the reads and outputs RA1 to RA3 and RA8 to RA7, the low-resolution data D6 is empty. In the read and output RA8, the read timing of the low-resolution data D6 from the row delay memory 172 and the read timing of the imaging data D5 from the row delay memory 182 are set such that the imaging data D5 and the low-resolution data D6 do not overlap.

Figure 11:
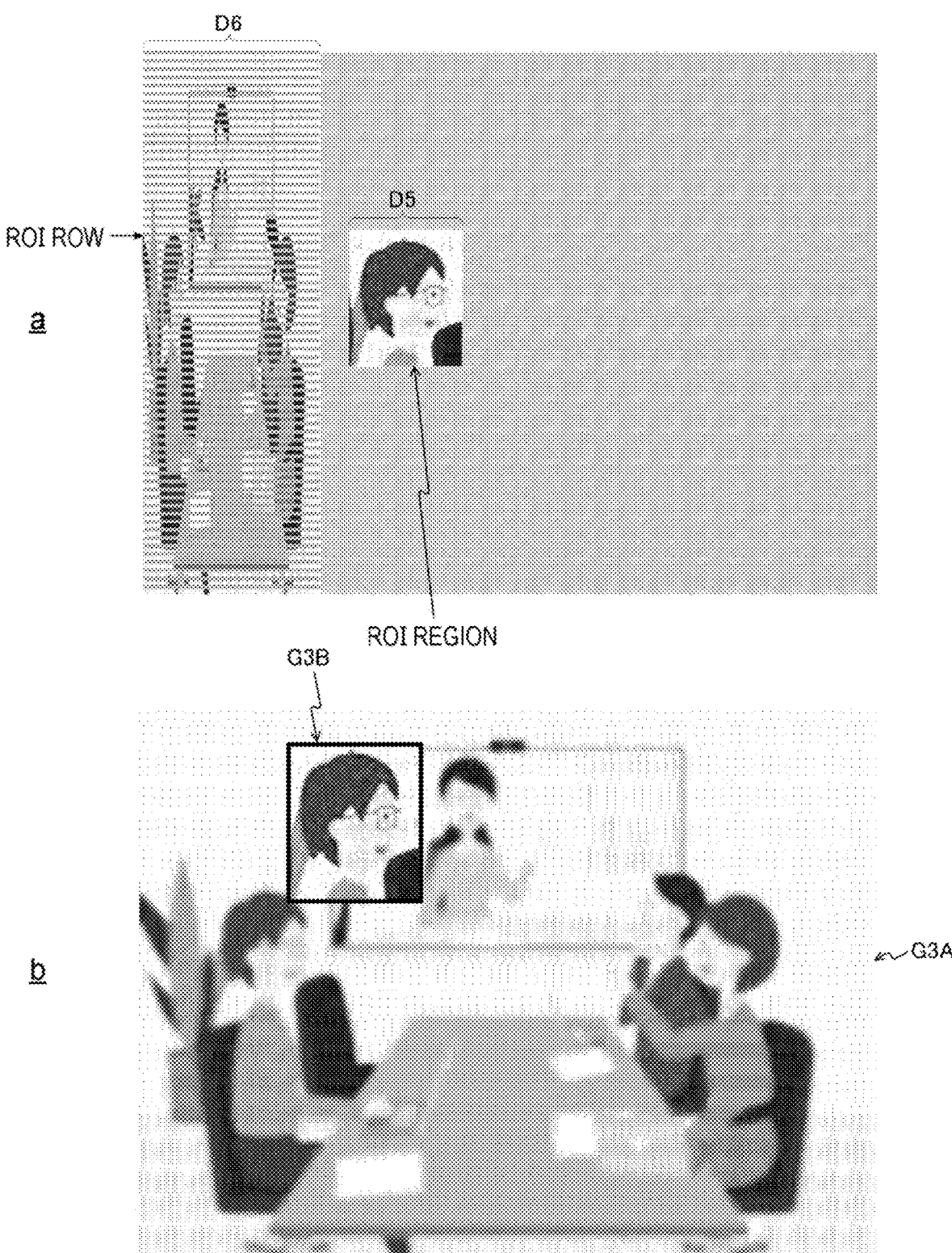
FIG. 11 is a diagram illustrating an example of the imaging data and the low-resolution data according to the third embodiment.

FIG. 11 is a diagram illustrating an example of the imaging data and the low-resolution data according to the third embodiment. Note that a in the drawing is a diagram illustrating a first example of the imaging data D5 and the low-resolution data D6 for one frame output from the solid-state imaging device 401. b in the drawing is a diagram illustrating an example of the composite image D7 combined on the basis of the imaging data D5 and the low-resolution data D6 of a in the drawing. Note that the ROI row in a of the drawing corresponds to the ROI row in FIG. 10.

In a of the drawing, the solid-state imaging device 401 outputs the imaging data D5 for a range of the ROI region, and outputs the low-resolution data D6 to a position other than the output position of the imaging data D5. The timing controller 412 can move the output position of the imaging data D5 in the ROI region in the row direction by adjusting the read timing of the imaging data D5 from the row delay memory 182. At this time, the solid-state imaging device 401 can output the imaging data D5 and the low-resolution data D6 for each row such that the imaging data D5 and the low-resolution data D6 do not overlap. The imaging data D5 and the low-resolution data D6 are input to the above-described image signal processor 103.

The image signal processor 103 generates the composite image D7 on the basis of the imaging data D5 and the low-resolution data D6. At this time, as illustrated in b of the drawing, the image signal processor 103 generates a high-resolution image G3B from the imaging data D5 of the ROI region, and generates a low-resolution image G3A from the low-resolution data D6. Then, the image signal processor 103 can generate the composite image D7 by inserting the high-resolution image G3B into the low-resolution image G3A.

Note that, in the above-described second embodiment, since there is no row delay memory 182, the imaging data D5 is output from the solid-state imaging device 401 according to the output timing of the imaging data D1 from the imaging unit 110. Therefore, in each row, the low-resolution data D6 needs to be output after the output of the imaging data D5 is completed. In the third embodiment, since the row delay memory 182 is provided, the output timing of the imaging data D5 from the solid-state imaging device 401 can be adjusted. Therefore, in the third embodiment, it is not necessary to output the low-resolution data D6 after the output of the imaging data D5 is completed in each row, and it is possible to reduce a time to complete the output per row.

As described above, in the above-described third embodiment, the row delay memory 172 that delays the timing of outputting the low-resolution data D2 to the selector 132 and the row delay memory 182 that delays the timing of outputting the imaging data D1 to the selector 132 are provided in the solid-state imaging device 401. Therefore, the solid-state imaging device 401 can adjust the output timing of the imaging data D5 and the low-resolution data D6, and can reduce the time to complete the output per row.

4. Fourth Embodiment

In the above-described third embodiment, the solid-state imaging device 401 has outputted the imaging data D5 in the ROI region, and has outputted the low-resolution data D6 in the region other than the ROI region. In a fourth embodiment, a solid-state imaging device 401 outputs low-resolution data D6 in a ROI region, and outputs imaging data D5 in a region other than the ROI region.

The configuration of the solid-state imaging device of the fourth embodiment is similar to the configuration of the solid-state imaging device 401 of the third embodiment described above. Note that a timing controller 412 controls output timing of each of row delay memories 172 and 182 and switching timing of a selector 132 such that low-resolution data D2 is output for a range of the ROI region. Furthermore, the timing controller 412 controls the output timing of each of the row delay memories 172 and 182 and the switching timing of the selector 132 such that imaging data D1 is output to a position other than an output position of the low-resolution data D2.

Figure 12:
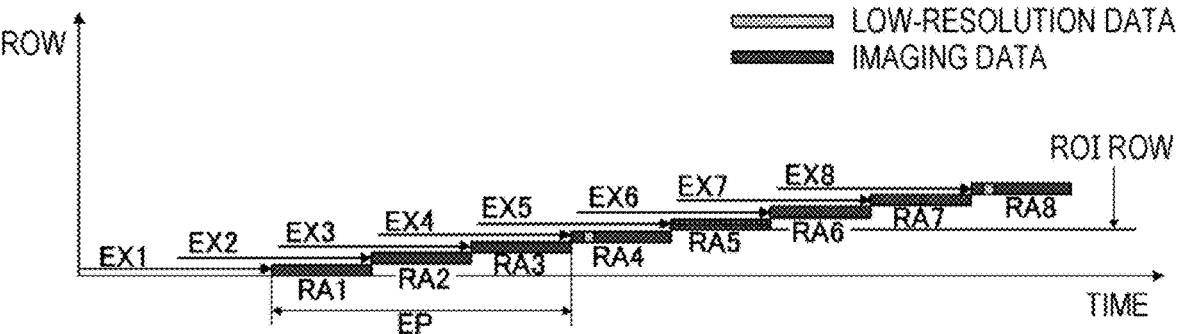
FIG. 12 is a timing chart illustrating read timing of imaging data and low-resolution data according to the fourth embodiment.

FIG. 12 is a timing chart illustrating read timing of imaging data and low-resolution data according to the fourth embodiment. Note that the drawing illustrates an example in which the vertical and horizontal dimensions of the imaging data D1 are reduced to ¼ as the low-resolution data D2. Furthermore, the drawing illustrates exposures EX1 to EX8 and reads and outputs RA1 to RAB for eight rows before and after a ROI row.

In the drawing, in the imaging unit 110, the exposures EX1 to EX8 are sequentially started row by row, and the reads and outputs RA1 to RAB of pixel signals are sequentially performed row by row. Here, in the three rows before the ROI row and the three rows after the ROI row, the reads and outputs RA1 to RA3 and RA8 to RA7 of the imaging data D5 of the rows are performed. In one row before the ROI row and one row after the ROI row, the reads and outputs RA4 and RA8 of the imaging data D5 of those rows and the low-resolution data D6 of the ROI region are performed.

In the reads and outputs RA1 to RA3 and RA8 to RA7, the low-resolution data D6 is empty. In each of the reads and outputs RA4 and RA8, the read timing of the low-resolution data D6 from the row delay memory 172 and the read timing of the imaging data D5 from the row delay memory 182 are set such that the imaging data D5 and the low-resolution data D6 do not overlap. At this time, the read timing of the low-resolution data D6 from the delay memory 172 and the read timing of the imaging data D5 from the row delay memory 182 may be set such that the low-resolution data D6 in the ROI region is inserted into the imaging data D5 in a region other than the ROI region.

Figure 13:
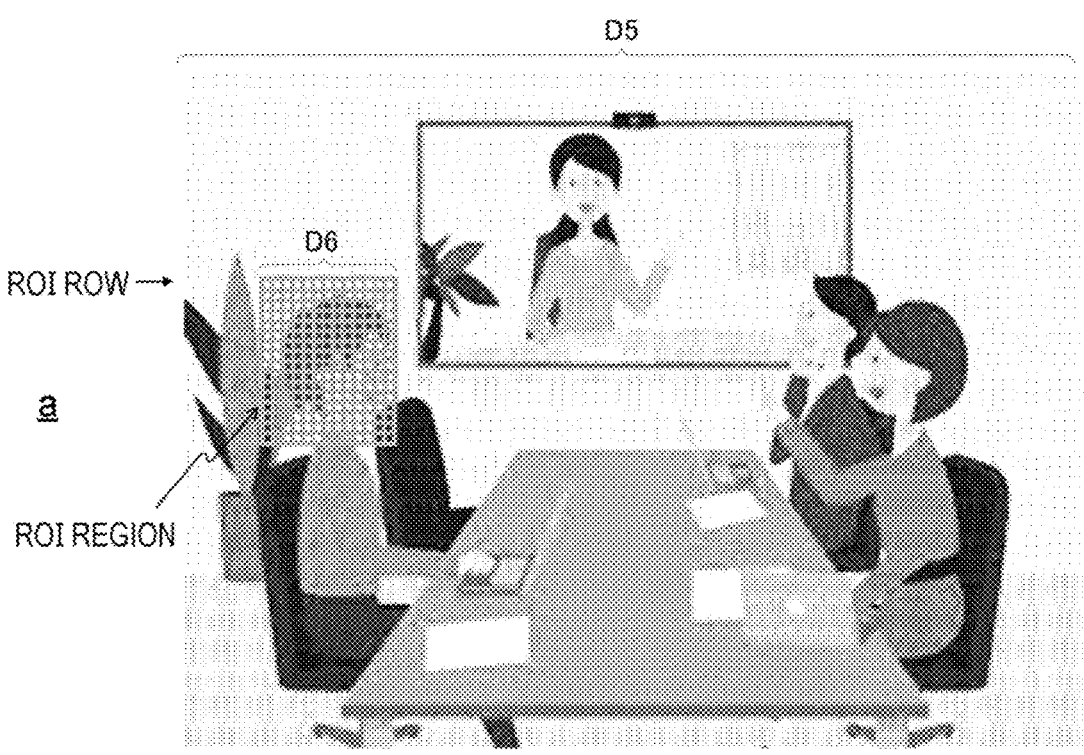
FIG. 13 is a diagram illustrating an example of the imaging data and the low-resolution data according to the fourth embodiment.
Figure 13:

FIG. 13 is a diagram illustrating an example of the imaging data and the low-resolution data according to the fourth embodiment. Note that a in the drawing is a diagram illustrating a second example of the imaging data D5 and the low-resolution data D6 for one frame output from the solid-state imaging device 401. b in the drawing is a diagram illustrating an example of a composite image D7 combined on the basis of the imaging data D5 and the low-resolution data D6 of a in the drawing. Note that the ROI row in a of the drawing corresponds to the ROI row in FIG. 12.

In a of the drawing, the solid-state imaging device 401 outputs the low-resolution data D6 for the range of the ROI region, and outputs the imaging data D5 to a position other than the output position of the imaging data D5. At this time, the solid-state imaging device 401 can output the imaging data D5 and the low-resolution data D6 for each row such that the imaging data D5 and the low-resolution data D6 do not overlap. For example, the solid-state imaging device 401 may output the low-resolution data D6 and the imaging data D5 in a state where the low-resolution data D6 in the ROI region is properly fitted in the position other than the ROI region of the imaging data D5. The imaging data D5 and the low-resolution data D6 are input to the above-described image signal processor 103.

The image signal processor 103 generates the composite image D7 on the basis of the imaging data D5 and the low-resolution data D6. At this time, as illustrated in b of the drawing, the image signal processor 103 generates a low-resolution image G4A from the low-resolution data D6 of the ROI region, and generates a high-resolution image G4B from the imaging data D5. Then, it is possible to generate the composite image D7 by inserting the low-resolution image G4A into the high-resolution image G4B.

As described above, in the above-described fourth embodiment, the solid-state imaging device 401 outputs the low-resolution data D6 in the ROI region, and outputs the imaging data D5 in the region other than the ROI region. Therefore, it is possible to make specification of a person difficult in the ROI region including a face or the like, and to protect privacy, and to provide a high-definition image in the region other than the ROI region.

5. Fifth Embodiment

In the above-described first embodiment, the pixel array unit 111, the vertical scanning unit 121, the column signal processing unit 131, the horizontal scanning unit 141, the timing control unit 151, the ROI control unit 112, the image processing unit 142, and the output interface 152 have been provided in the solid-state imaging device 101. In a fifth embodiment, a pixel array unit 111, a vertical scanning unit 121, a column signal processing unit 131, a horizontal scanning unit 141, a timing control unit 151, a ROI control unit 112, an image processing unit 142, and an output interface 152 are divided into a plurality of chips and arranged.

Figure 14:
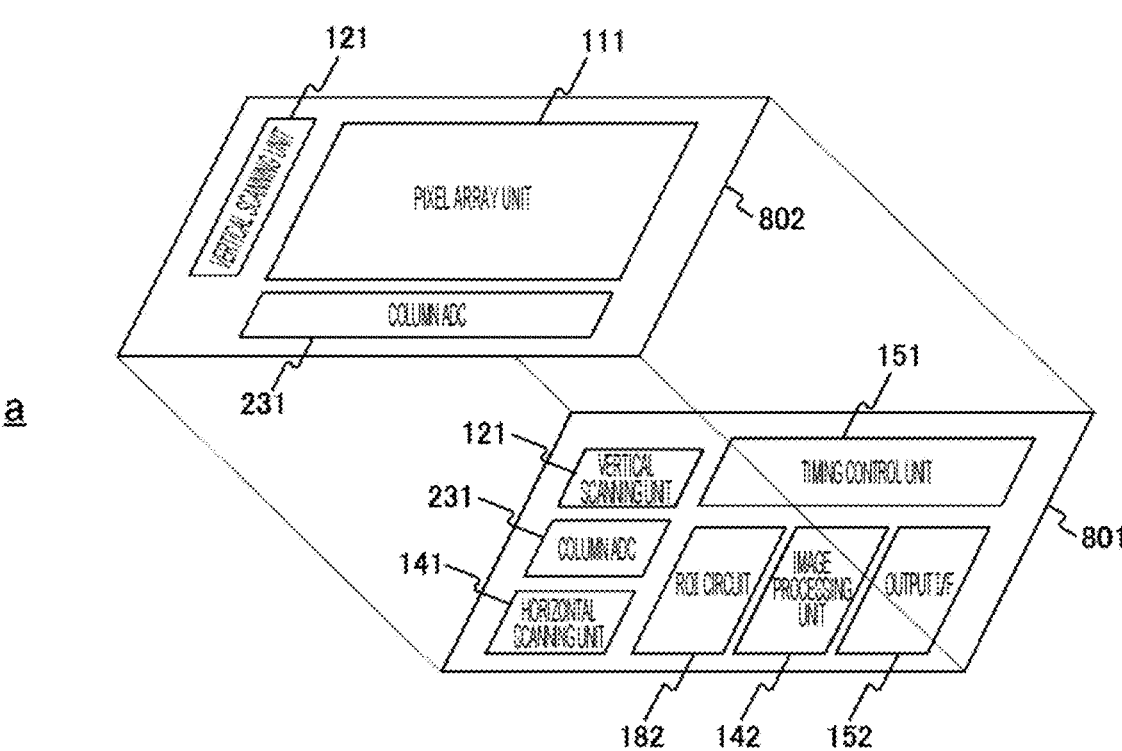
FIG. 14 is block diagrams illustrating configuration examples of a solid-state imaging device according to a fifth embodiment.
Figure 14:
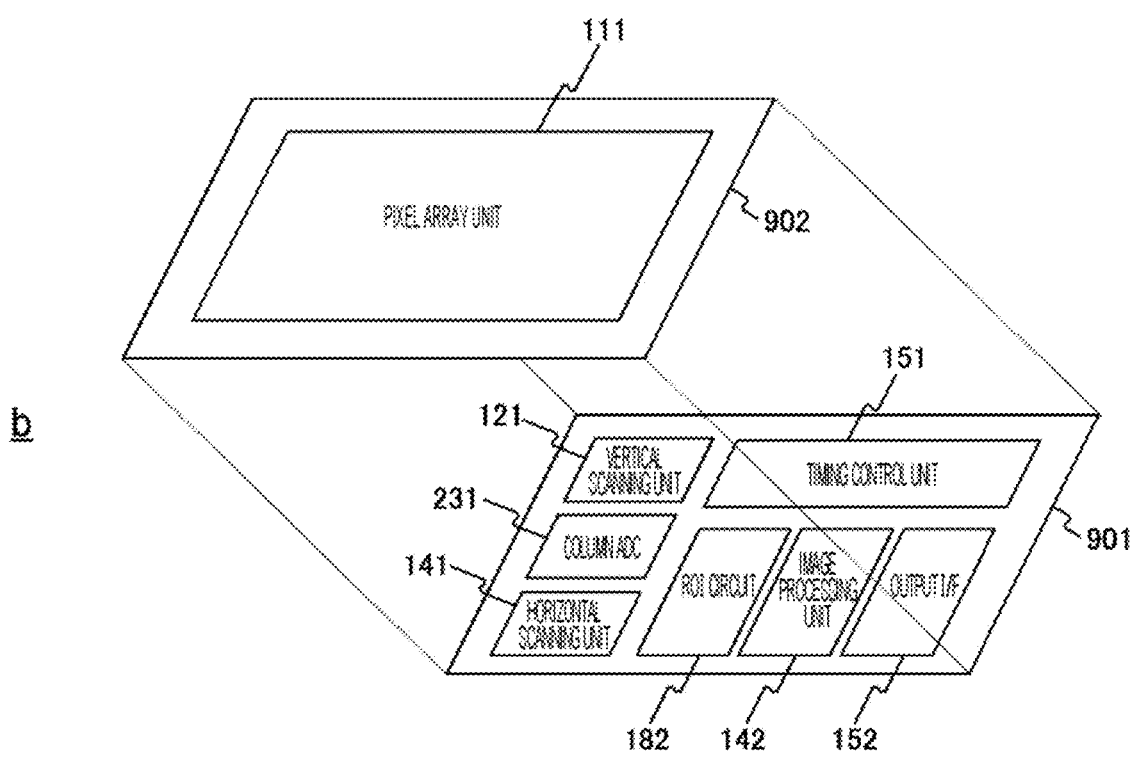

FIG. 14 is block diagrams illustrating configuration examples of a solid-state imaging device according to the fifth embodiment. Note that a in the drawing is a block diagram illustrating a first example of a stacked structure of a solid-state imaging device 101, and b in the drawing is a block diagram illustrating a second example of the stacked structure of the solid-state imaging device 101.

In a of the drawing, the solid-state imaging device 101 includes semiconductor chips 801 and 802. The semiconductor chip 802 is stacked on the semiconductor chip 801. Hybrid bonding including bonding of Cu wirings can be used for bonding the semiconductor chip 801 and the semiconductor chip 802. As a substrate material of the semiconductor chips 801 and 802, for example, single crystal Si can be used.

On the semiconductor chip 802, the pixel array unit 111, the vertical scanning unit 121, and a column ADC 231 are arranged. In the semiconductor chip 801, the vertical scanning unit 121, the column ADC 231, the horizontal scanning unit 141, the timing control unit 151, a ROI circuit 182, the image processing unit 142, and the output interface 152 are arranged. The ROI circuit 182 includes the above-described ROI control unit 112, a scaler 122, and a selector 132.

As illustrated in b of the drawing, the solid-state imaging device 101 may include semiconductor chips 901 and 902. The semiconductor chip 902 is stacked on the semiconductor chip 901.

The pixel array unit 111 is arranged on the semiconductor chip 902. In the semiconductor chip 901, the vertical scanning unit 121, the column ADC 231, the horizontal scanning unit 141, the timing control unit 151, the ROI circuit 182, the image processing unit 142, and the output interface 152 are arranged.

As described above, in the above-described fifth embodiment, the pixel array unit 111, the vertical scanning unit 121, the column ADC 231, the horizontal scanning unit 141, the timing control unit 151, the ROI circuit 182, the image processing unit 142, and the output interface 152 are stacked. Therefore, a mounting area of the solid-state imaging device 101 can be reduced, and the solid-state imaging device 101 can be mounted with high density.

Note that the above-described stacked structure of the fifth embodiment may be applied to the above-described solid-state imaging device 301 of the second embodiment, or may be applied to the above-described solid-state imaging device 401 of the third embodiment or the fourth embodiment. Furthermore, in the above-described embodiment, the method of cutting out an image of the ROI region or of the row including the ROI region by the selector 132 has been described, but the ROI control unit 112 may be used to cut out the image.

Furthermore, the embodiments described above show examples for embodying the present technology, and the respective matters in the embodiments and the respective matters specifying the invention in the claims have correspondence relationships. Similarly, the respective matters specifying the invention in the claims and the respective matters with the same names in the embodiments of the present technology have correspondence relationships. However, the present technology is not limited to the embodiments and can be embodied by applying various modifications to the embodiments without departing from the gist of the present technology. In addition, effects described in the present specification are merely examples and are not limited, and other effects may be provided.

Note that the present technology can also have the following configuration.

(1) A solid-state imaging device including:

an imaging unit configured to generate imaging data;

a resolution conversion unit configured to reduce a resolution of the imaging data to convert the imaging data into low-resolution data; and a switching unit configured to switch between output of the imaging data and output of the low-resolution data on the basis of setting of a designated region on an imaging region of the imaging unit.

(2) The solid-state imaging device according to (1) above, further including: a region control unit configured to control the designated region on the imaging region of the imaging unit and control switching of the switching unit on the basis of a position of the designated region.

(3) The solid-state imaging device according to (2), in which the switching unit outputs the imaging data for a row including the designated region, and outputs the low-resolution data for a row not including the designated region.

(4) The solid-state imaging device according to (2) or (3), further including: a first memory configured to store the low-resolution data generated by the resolution conversion unit for one row and output the low-resolution data to the switching unit.

(5) The solid-state imaging device according to (3) or (4), in which the region control unit includes a timing controller that controls output timing of the first memory and switching timing of the switching unit on the basis of the setting of the designated region.

(6) The solid-state imaging device according to (5), in which the timing controller controls the output timing of the first memory and the switching timing of the switching unit such that the low-resolution data is output to a position other than the designated region and the imaging data is output to a position of the designated region.

(7) The solid-state imaging device according to any one of (4) to (6), further including: a second memory configured to store the imaging data generated by the imaging unit for one row and outputs the imaging data to the switching unit.

(8) The solid-state imaging device according to (7) above, in which the switching unit outputs the low-resolution data stored in the first memory and the imaging data stored in the second memory for each row so as not to overlap.

(9) The solid-state imaging device according to (7) or (8), in which the region control unit includes a timing controller that controls output timing of the first memory, output timing of the second memory, and switching timing of the switching unit on the basis of the setting of the designated region.

(10) The solid-state imaging device according to any one of (7) to (9), in which the timing controller controls the output timing of the first memory, the output timing of the second memory, and the switching timing of the switching unit such that the imaging data is output for a range of the designated region and the low-resolution data is output to a position other than an output position of the imaging data.

(11) The solid-state imaging device according to any one of (7) to (10), in which the timing controller controls the output timing of the first memory, the output timing of the second memory, and the switching timing of the switching unit such that the low-resolution data is output for a range of the designated region and the imaging data is output to a position other than an output position of the low-resolution data.

(12) A method of outputting imaging data, the method including:

a procedure of generating imaging data;

a procedure of reducing a resolution of the imaging data to convert the imaging data into low-resolution data; and a procedure of switching between output of the imaging data and output of the low-resolution data on the basis of setting of a designated region on an imaging region in which the imaging data is captured.

REFERENCE SIGNS LIST

101, 301, 401 Solid-state imaging device
110 Imaging unit
111 Pixel array unit
121 Vertical scanning unit
131 Column signal processing unit
141 Horizontal scanning unit
151 Timing control unit
112 ROI control unit
122 Scaler
132 Selector
142 Image processing unit
152 Output interface
201 Pixel 212, 312, 412 Timing controller
172, 182 Row delay memory

The invention claimed is:

1. A solid-state imaging device comprising:
an imaging circuit configured to generate imaging data;
a scaler circuit configured to reduce a resolution of the imaging data to convert the imaging data into low-resolution data;
a switching circuit configured to switch between output of the imaging data and output of the low-resolution data on a basis of setting of a designated region on an imaging region of the imaging circuit;
a region control circuit configured to control the designated region on the imaging region of the imaging circuit and control switching of the switching circuit on a basis of a position of the designated region; and
a first memory configured to store the low-resolution data generated by the scaler circuit for one row and output the low-resolution data to the switching circuit, wherein
the region control circuit includes a timing controller that controls output timing of the first memory and switching timing of the switching circuit on the basis of the setting of the designated region.

2. The solid-state imaging device according to claim 1, wherein
the switching circuit outputs the imaging data for a row including the designated region, and outputs the low-resolution data for a row not including the designated region.

3. The solid-state imaging device according to claim 1, wherein
the timing controller controls the output timing of the first memory and a switching timing of the switching circuit such that the low-resolution data is output to a position other than the designated region and the imaging data is output to a position of the designated region.

4. A solid-state imaging device comprising:
an imaging circuit configured to generate imaging data;
a scaler circuit configured to reduce a resolution of the imaging data to convert the imaging data into low-resolution data;
a switching circuit configured to switch between output of the imaging data and output of the low-resolution data on a basis of setting of a designated region on an imaging region of the imaging circuit;
a region control circuit configured to control the designated region on the imaging region of the imaging circuit and control switching of the switching circuit on a basis of a position of the designated region;
a first memory configured to store the low-resolution data generated by the scaler circuit for one row and output the low-resolution data to the switching circuit; and
a second memory configured to store the imaging data generated by the imaging circuit for one row and outputs the imaging data to the switching circuit.

5. The solid-state imaging device according to claim 4, wherein
the switching circuit outputs the low-resolution data stored in the first memory and the imaging data stored in the second memory for each row so as not to overlap each other.

6. The solid-state imaging device according to claim 4, wherein
the region control circuit includes a timing controller that controls output timing of the first memory, output timing of the second memory, and switching timing of the switching circuit on the basis of the setting of the designated region.

7. The solid-state imaging device according to claim 6, wherein
the timing controller controls the output timing of the first memory, the output timing of the second memory, and a switching timing of the switching circuit such that the imaging data is output for a range of the designated region and the low-resolution data is output to a position other than an output position of the imaging data.

8. The solid-state imaging device according to claim 6, wherein
the timing controller controls the output timing of the first memory, the output timing of the second memory, and a switching timing of the switching circuit such that the low-resolution data is output for a range of the designated region and the imaging data is output to a position other than an output position of the low-resolution data.

9. A method of outputting imaging data, the method comprising:
generating imaging data;
reducing a resolution of the imaging data to convert the imaging data into low-resolution data; and
switching between output of the imaging data and output of the low-resolution data on a basis of setting of a designated region on an imaging region in which the imaging data is captured;
controlling the designated region on the imaging region and controlling the switching on a basis of a position of the designated region;
storing, in a first memory, the low-resolution data for one row and outputting the low-resolution data; and
controlling output timing of the first memory and a timing of the switching on the basis of the setting of the designated region.

10. The method according to claim 9, further comprising:
outputting the imaging data for a row including the designated region, and outputting the low-resolution data for a row not including the designated region.

11. The method according to claim 9, further comprising:
controlling the output timing of the first memory and the timing of the switching such that the low-resolution data is output to a position other than the designated region and the imaging data is output to a position of the designated region.

* * * * *